US011590982B1

(12) United States Patent
Daniels

(10) Patent No.: US 11,590,982 B1
(45) Date of Patent: Feb. 28, 2023

(54) TRIP BASED CHARACTERIZATION USING MICRO PREDICTION DETERMINATIONS

(71) Applicant: Lytx, Inc., San Diego, CA (US)

(72) Inventor: Jesse Daniels, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 613 days.

(21) Appl. No.: 16/545,654

(22) Filed: Aug. 20, 2019

(51) Int. Cl.

| | |
|---|---|
| ***B60W 40/09*** | (2012.01) |
| ***G07C 5/02*** | (2006.01) |
| ***G07C 5/08*** | (2006.01) |
| *G06V 20/59* | (2022.01) |

(52) U.S. Cl.
CPC ............... *B60W 40/09* (2013.01); *G07C 5/02* (2013.01); *G07C 5/08* (2013.01); *G06V 20/597* (2022.01)

(58) Field of Classification Search
CPC ....... B60W 40/09; G06V 20/597; G07C 5/08; G07C 5/02
See application file for complete search history.

(56) References Cited

U.S. PATENT DOCUMENTS

| | | | | |
|---|---|---|---|---|
| 2015/0186714 | A1* | 7/2015 | Ren | G06V 20/597 348/77 |
| 2016/0046298 | A1* | 2/2016 | DeRuyck | G06V 20/597 340/576 |
| 2019/0147263 | A1* | 5/2019 | Kuehnle | G06V 20/597 340/439 |
| 2020/0086879 | A1* | 3/2020 | Lakshmi Narayanan | G06V 40/20 |
| 2021/0269045 | A1* | 9/2021 | Katz | G06V 20/56 |
| 2021/0394775 | A1* | 12/2021 | Julian | G08G 1/164 |

* cited by examiner

*Primary Examiner* — Behrang Badii
(74) *Attorney, Agent, or Firm* — Van Pelt, Yi & James LLP

(57) ABSTRACT

A system for characterizing driver behavior includes an interface and a processor. The interface is configured to receive a set of vehicle data, wherein the set of vehicle data comprises embedded image vectors that characterize vehicle data over a short time scale. The processor is configured to determine, using a long time scale model, a long time scale label based at least in part on the embedded image vectors.

21 Claims, 7 Drawing Sheets

104 Vehicle Data Server
110 Review System
100 Network
112 User System
106
102 Vehicle Event Recorder
108 Vehicle Sensors

TRIP BASED CHARACTERIZATION USING MICRO PREDICTION DETERMINATIONS

BACKGROUND OF THE INVENTION

Modern transportation vehicles (e.g., airplanes, boats, trains, cars, trucks, etc.) often include a vehicle event recorder to support driver safety, operational safety, and operational productivity. A vehicle event recorder typically includes a set of sensors (e.g., video recorders, accelerometers, global positioning system sensors, etc.) that report data that can be analyzed to characterize distracting or unsafe driver behavior (e.g., cell phone use, eating, drinking, smoking, not looking ahead, not wearing seat belt, etc.). Analysis of such data may be inaccurate when performed over a short time scale (i.e., micro predictions) that are typical due to device limitations and due to temporary poor image quality (e.g., image resolution, lighting, angle of view, etc.). In addition, current solutions involve human review of sensor and video data to improve accuracy, which can be tedious, inefficient, and costly. This creates a problem as how to efficiently and cost-effectively analyze vehicle event data to improve vehicle event recorder data characterization.

BRIEF DESCRIPTION OF THE DRAWINGS

Various embodiments of the invention are disclosed in the following detailed description and the accompanying drawings.

DETAILED DESCRIPTION

Figure 1:
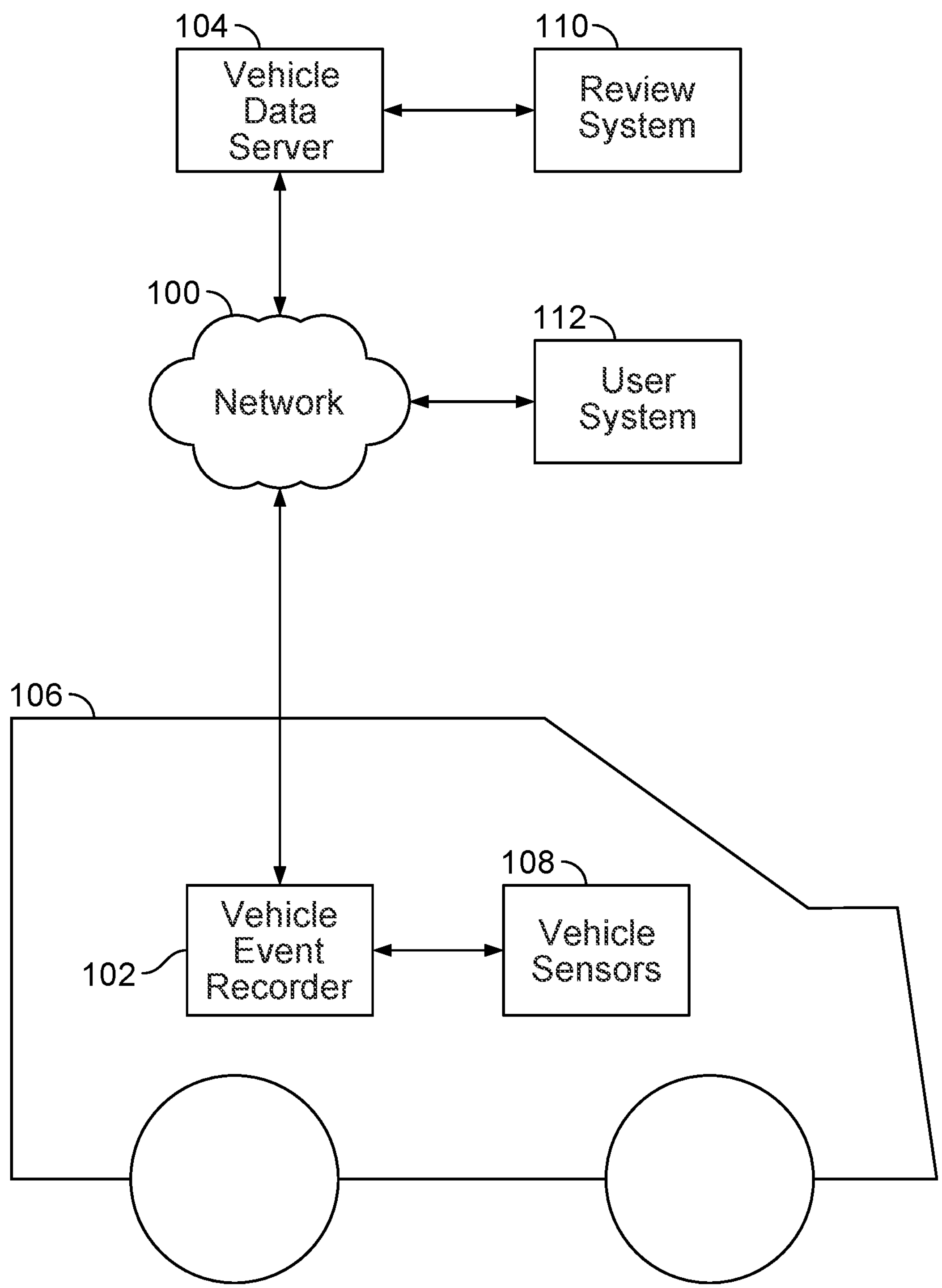
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for characterizing driver behavior is disclosed. The system comprises an interface and a processor. The interface is configured to receive a set of vehicle data. The set of vehicle data includes embedded image vectors that characterize vehicle data over a short time scale. The processor is configured to determine, using a long time scale model, a long time scale label based at least in part on the embedded image vectors.

In some embodiments, the processor is further configured to train the long time scale model using the embedded image vectors, short time scale labels, short time scale label probabilities, and human labeled image data associated with the embedded image vectors. In some embodiments, the short time scale labels comprise a micro prediction label—for example, a label associated with a 5 second time period, a 10 second period, a 15 second period, or any other appropriate short time scale period.

In some embodiments, the system further comprises a memory and/or user interface that is/are coupled to the processor and configured to provide the processor with instructions.

A vehicle event recorder is able to record sensor data both internal and external to a vehicle. The sensor data can be used to determine events related to a driver that characterize the driver's behavior while operating the vehicle. The events can be related to external events—for example, how the driver interacts with the road (e.g., hard braking, speeding, frequent lane changes, etc.), with traffic (e.g., following too close, collision, speed mismatch, etc.), with obstacles on the road (e.g., hitting or missing a pot hole, etc.), with pedestrians (e.g., slowing or stopping for a pedestrian, hitting a pedestrian, etc.), etc. The events can also be related to internal events—for example, what the driver's behavior is while driving (e.g., paying attention, being distracted, being tired, smoking, using a cell phone, eating, unbelted, avoiding an obstruction, etc.). For an employer employing drivers (e.g., a business that has a fleet of delivery or service vehicles), it is desirable to understand both internal and external events during the operation of a vehicle in their fleet. Typically, the sensor data from an event recorder is analyzed by an event detector and short time scale model resident in the processor of the vehicle event recorder and is annotated with labels that identify, describe, classify, and/or otherwise characterize the events in the sensor data. These labels can then be provided to the employer directly or analyzed (e.g., statistics generated, flags or warnings generated, etc.) and the analysis results provided to the employer.

With hundreds of thousands of vehicle event recorders and thousands of events per vehicle, the amount of event data that needs labeling numbers in the tens or hundreds of millions of instances. In addition, each event may be associated with a plurality of labels leading to a large data set. One solution to making the overall system more efficient and cost-effective is to reduce the size of the data set by converting pixel-based video frames into a vector format that summarizes driver behavior over a short time scale—for example, an image vector that summarizes 10 seconds of video data. However, each image vector representation of driver behavior over a short time scale may suffer from reduced quality due either to the vector conversion process and/or due to poor image quality of the native video data. This reduced quality in turn can degrade the accuracy of characterizing and labeling driver behavior. Additionally, a short time scale model is typically not as accurate as reviewing data over a longer time scale especially by human review, since each micro prediction is independent of one another and the resultant characterization process of a driver's behavior over the course of a trip tends to be noisy. The system disclosed addresses these shortcomings.

A long time scale model is trained using an existing labeled set of short time scale vehicle data and long time scale human labeled image data that includes, as a subset, the short time scale video frames that correspond to the same events of the short time scale vehicle data. The long time scale model is trained to reach the same conclusions as the human reviewers (e.g., up to a threshold improvement level) using only the set of short time scale vehicle data generated from video that was recorded during and prior to an event. In addition to automating the process, the trained long time scale model also helps mitigate the costs and time involved in transferring large amounts of native video data from the vehicle event recorder to the vehicle data server by utilizing a much-reduced dataset consisting of embedded image vectors, short time scale labels, and short time scale label probabilities. The disclosed system for characterizing driver behavior using long time scale data is an improvement over short time scale labeling by its improved accuracy.

The system for an automated process to characterize driver behavior includes one or more vehicle event recorders, a communication network, a vehicle data server, one or more processors, a short time scale labeling model, a long time scale labeling model, a review system, and a database. The vehicle event recorder records video of the vehicle driver and the driver's local proximity. The vehicle event recorder transmits the video via the communication network to the vehicle data server's interface for archival storage in the vehicle data server's database. Over long periods of time (e.g., years) and utilizing multiple vehicle event recorders (e.g., hundreds of thousands), large amounts of archived video data events (e.g., millions) are analyzed, classified, and labeled by human reviewers and used to train the long time scale model.

The vehicle event recorder processor utilizes an event detector and short time scale labeling model to generate embedded image vectors, short time scale labels, and short time scale probabilities (i.e., the set of short time scale vehicle data). In some embodiments, the set of short time scale vehicle data is generated from the same recorded video that was sent to the vehicle data server for human review to create a set of short time scale training data that is transmitted to the vehicle data server for use in training the long time scale model.

The vehicle data server processor comprises a model trainer and the long time scale model. The model trainer builds a long time scale model by training a machine learning model, a neural network, or any other appropriate model. The model trainer builds the model utilizing short and long time scale vehicle event data stored in the database of the vehicle data server. The long time scale model is trained using an existing labeled set of short time scale vehicle event data (i.e., the set of short time scale training data) and long time scale human labeled image data associated with the same events.

The short time scale vehicle event data comprise image vectors that represent selected short time scale video frames (e.g., I-frames) captured during an event by the vehicle event recorder sensors, and, as determined by the short time scale model, short time scale labels and short time scale probabilities.

The human labeled image data associated with the vehicle events comprise video data captured during and prior to an event. The human labeled image data includes, as a subset, the short time scale video frames that correspond to the same event. The human reviewers generate behavioral classification labels by considering image data leading up to a given point-in-time event. The long time scale human review process results in increased confidence in a specific short time scale observation. For example, the short time scale model may incorrectly label a driver as not wearing a seat belt based on the analysis of a limited number of image frames wherein the image frames were of the driver passing through a poorly lit tunnel and the poor lighting limited the optical contrast of the seat belt against the driver's clothing resulting in an erroneous conclusion. However, human review of long time scale image data in this example would have observed that the driver was wearing a seat belt prior to entering the tunnel, and, having not observed any actions taken by the driver to remove the belt, correctly conclude that the driver was wearing a seat belt while driving through the tunnel.

The higher confidence classification labels generated by human review of long time scale video data are used to train the long time scale model to reach the same conclusions (e.g., up to a threshold improvement level) as the human review but using a much smaller data set (i.e., the set of short time scale vehicle data) generated from video that was recorded during and prior to an event. In some embodiments, the embedded image vectors, short time scale labels, and short time scale label probabilities are approximately 200 times smaller than a full data set sent over for a human review to be able to generate labels for the data set.

The system improves processing by making more accurate characterizations of sensor data from a vehicle event recorder. The system improves processing using summary data (e.g., embedded image vectors, short time scale labels, and short time scale label probabilities) generated from a compact short time scale processing model that is able to be run on the resource limited vehicle event recorder. The system uses a long time scale complex model that is trained on the summary data and human analysis of the summary data and its corresponding fuller data set. The long time scale model provides a characterization of vehicle event recorder data more efficiently and cost-effective compared to human review and the short time scale compact processing previously available.

FIG. 1 is a block diagram illustrating an embodiment of a system including a vehicle event recorder. In the example shown, when vehicle 106 travels, vehicle event recorder 102 and vehicle sensors 108 capture sensor data (e.g., audio/video data, global positioning system data, accelerometer data, braking data, lane data, etc.). The sensor data is measured or received by vehicle event recorder 102. Vehicle event recorder 102 uses the data to determine events (e.g., collision events, hazardous maneuver events, distracted driving events, etc.). For example, when the vehicle event recorder 102 determines an event (e.g., a lane departure event), it begins a process for identifying whether an inappropriate driving behavior is associated with the event. This association can be used to determine whether the event was potentially caused by an inappropriate driving behavior. For example, it may be determined that the driver departed the lane because of distraction from talking on a cell phone.

Vehicle event recorder 102 comprises a vehicle event recorder mounted in a vehicle (e.g., a car or truck). Vehicle event recorder 102 has its own sensors and is also in communication with vehicle sensors 108. Vehicle event recorder 102 sensors comprise a set of sensors—for example, an exterior video camera, an exterior still camera, an interior video camera, an interior still camera, a microphone, an accelerometer, a gyroscope, an outdoor temperature sensor, a moisture sensor, a laser line tracker sensor, vehicle state sensors, or any other appropriate sensors. Vehicle sensors 108 comprise a set of sensors—for example, a speedometer, an accelerator pedal sensor, a brake pedal sensor, an engine revolution per minute (RPM) sensor, an engine temperature sensor, a headlight sensor, an airbag deployment sensor, driver and passenger seat weight sensors, an anti-locking brake sensor, an engine exhaust sensor, a gear position sensor, a turn signal sensor, a cabin equipment operation sensor, or any other appropriate vehicle state sensors.

Vehicle event recorder 102 comprises a system for receiving and processing sensor data (e.g., Audio/Visual (A/V) data). Processing sensor data comprises filtering data, identifying patterns in data, detecting events, etc. Vehicle event recorder 102 is mounted on vehicle 106 in any appropriate location—for example the chassis, the front grill, the dashboard, the rear-view mirror, the rear window or wall, the floor, etc. There are times when vehicle event recorder 102 comprises multiple units mounted in different locations within vehicle 106 instead of a single unit, particularly when there are space constraints for a given location (e.g., behind the rear-view mirror) and more space is required to house electronic components.

Vehicle event recorder 102 comprises a communications system for communicating with network 100. Network 100 comprises a network for communications. Network 100 comprises one or more of a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, etc. There are instances when network 100 comprises multiple networks, for instance, multiple interconnected networks spanning different regions, networks operating at different times, overlaid networks with different access permissions, networks with different bandwidth, etc. Different networks comprising network 100 typically comprise different bandwidth cost (e.g., a wired network has a very low cost, a wireless Ethernet connection has a moderate cost, a cellular data network has a high cost, etc.). In some embodiments, network 100 has a different cost at different times (e.g., a higher cost during the day and a lower cost at night). Vehicle event recorder 102 communicates with vehicle data server 104 via network 100.

Vehicle event data collected by vehicle event recorder 102 is sent to vehicle data server 104. In some embodiments, long time scale vehicle event data in the form of A/V data (i.e., video data) is recorded on vehicle event recorder 102 as full-resolution uncompressed video. In some embodiments, A/V event data is made available for download to vehicle data server 104 in both uncompressed full-resolution and compressed lower-resolution formats. In various embodiments, the format type for download to vehicle data server 104 is determined in part by considering the cost of the available methods of transmission. For example, transmission of large amounts of video data via a cellular data network while the vehicle is en route can be much more costly than using a local Wi-Fi service at select vehicle stopping points. Transmission of a compact data set (e.g., a smaller sized video summary) en route provides more timely access to event data than high-resolution data access limited to select vehicle stopping points (e.g., that may occur only once or twice a day). Transmission of full-resolution video is useful over longer time periods to provide high quality video event data useful as training and test data to improve long time scale model performance.

In some embodiments, vehicle event data recorded on vehicle event recorder 102 is processed to generate summary image vectors that characterize vehicle event data over a short time scale (e.g., 5 seconds, 10 seconds, 15 seconds, or any other appropriate short time scale). In some embodiments, the vehicle event recorder processor generates a short time scale label and short time scale probability for each summary image vector and embeds that information for transmission to vehicle data server 104 as an embedded image vector. In some embodiments, the embedded image vectors, along with the probabilities and labels (classes) for each behavior that the system is predicting, are generated, which are then subsequently transmitted to the server.

In some embodiments, the short time scale labeling model is generated to run on vehicle event recorder 102. The short time scale labeling model comprises a version tailored for the processor and/or memory of vehicle event recorder 102 (e.g., a less processor intensive version and/or less memory intensive version).

In some embodiments, the short time scale labeling model in vehicle event recorder 102 is used to label new events received via vehicle sensors 108. In some embodiments, the video event data used by the short time scale labeling model is lower-resolution compressed video to limit demand on the processor in vehicle event recorder 102 (e.g., the vehicle event recorder processor is much less powerful than a processor that can be incorporated into vehicle data server 104). In some embodiments, the labeling model that resides in vehicle data server 104 (i.e., the long time scale model) utilizes a more powerful processor to analyze the received set of vehicle data.

Vehicle data server 104 transmits received long time scale vehicle event data (e.g., video data) to review system 110 so that the data can be reviewed by a set of reviewers (e.g., a set of human reviewers). In some embodiments, the set of reviewers is of high quality (e.g., very experienced, allowed more time for analysis, given a limited set of classifications, etc.). The reviewers annotate the events in the vehicle event data with labels that identify, describe, classify, and/or otherwise characterize the events (e.g., by reviewing long time scale video data, video data leading up to each event, and/or video data after event, etc.). In order to develop an improved system, the long time scale labeled event data is used to develop a long time scale model. In some embodiments, the labeled event data is used to provide statistics and monitoring information to user system 112.

Both the human labeled image data and the short time scale training data are used for training the long time scale model. The training process is iterated until the long time scale model error shows a performance improvement less than a threshold improvement compared to a last iteration (e.g., 10%, 5%, 2%, 1%, etc.) or a predefined number of iterations is reached. A typical metric for determining performance is average precision for each class in the model. In some embodiments, the finalized long time scale model is run by vehicle data server 104 to label new vehicle event data received from vehicle event recorder 102 (e.g., test vehicle data or any other appropriate set of new vehicle data).

Figure 2:
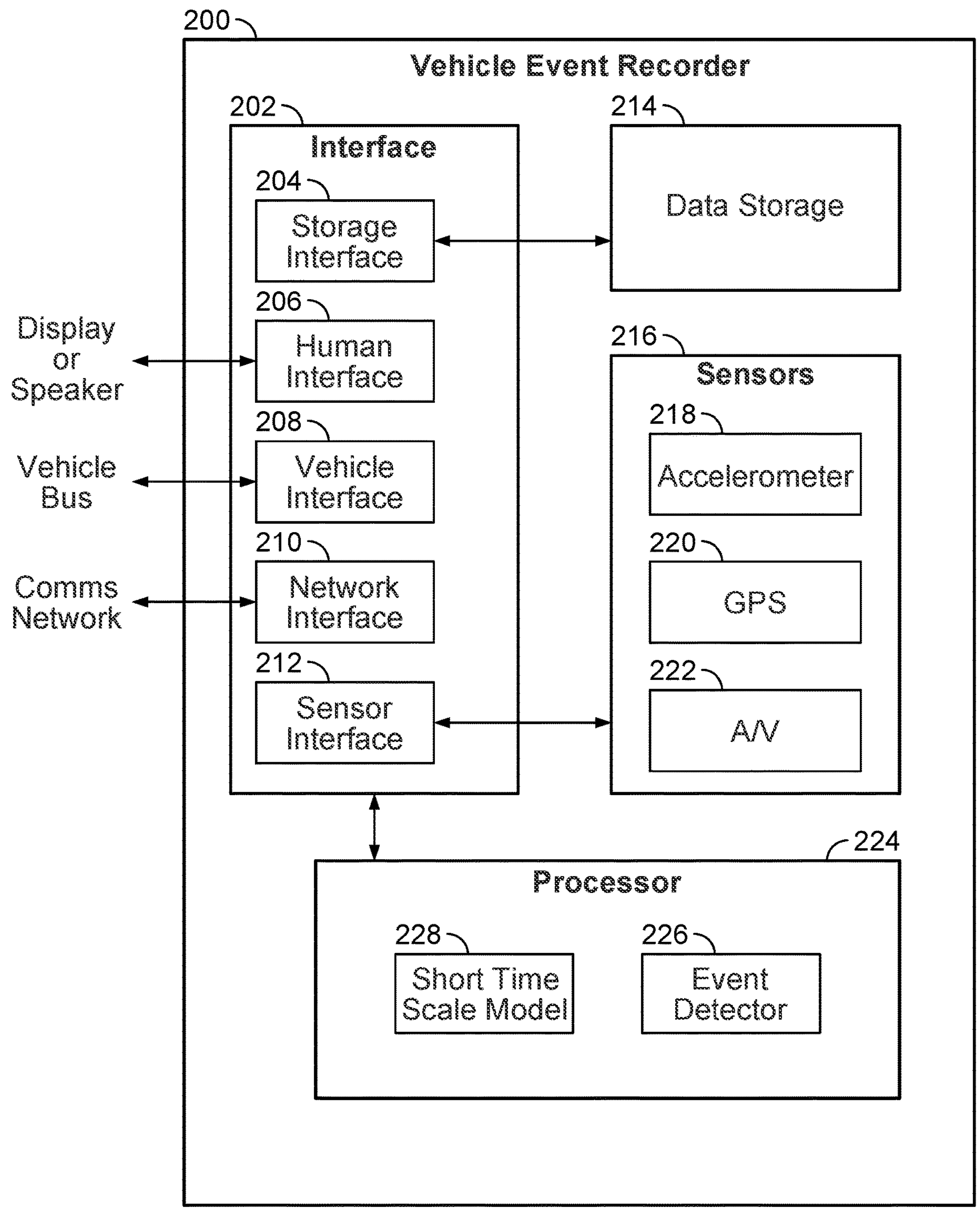
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 is used to implement vehicle event recorder 102 of FIG. 1. In the example shown, vehicle event recorder 200 monitors sensor signals from internal sensors 216 (e.g., accelerometer 218, GPS sensor 220, A/V sensor 222) or from vehicle sensors via vehicle interface 208.

Vehicle event recorder 200 communicates with a vehicle data server using network interface 210 (e.g., using a wired or wireless network such as a WiFi™ or cellular network). Vehicle event recorder 200 transmits sensor data, vehicle data, vehicle identification data, anomalous event data, driver quality data, etc. to the vehicle data server. Vehicle event recorder 200 comprises interface 202. Interface 202 comprises a set of interfaces to other systems. Human interface 206 comprises an interface to a human interaction system—for example, an audio output (e.g., a speaker), a display output, a haptic output, etc. Sensor interface 212 comprises an interface to one or more sensors for receiving sensor data. Sensor interface 212 comprises an interface to one or more vehicle event recorder sensors. In various embodiments, vehicle event recorder sensors comprise an exterior video camera, an exterior still camera, an interior video camera, an interior still camera, a microphone, an accelerometer, a gyroscope, an outdoor temperature sensor, a moisture sensor, a laser line tracker sensor, or any other appropriate sensors. Vehicle interface 208 interfaces with vehicle state sensors possibly including a speedometer, an accelerator pedal sensor, a brake pedal sensor, an engine RPM sensor, an engine temperature sensor, a headlight sensor, an airbag deployment sensor, driver and passenger seat weight sensors, an anti-locking brake sensor, shocks sensors, an engine exhaust sensor, a gear position sensor, a turn signal sensor, a cabin equipment operation sensor, or any other appropriate vehicle state sensors. In some embodiments, vehicle interface 208 comprises a connection to a vehicle bus such as an on-board diagnostics (OBD) bus (e.g., society of automotive engineers (SAE) J1939, J1708/J1587, OBD-II, CAN BUS, etc.). In some embodiments, vehicle event recorder 200 communicates with vehicle state sensors via the OBD bus.

Vehicle interface 208 further comprises an interface to one or more vehicle systems (e.g., for adjusting vehicle control parameters, for putting the vehicle in a safe mode, etc.). Network interface 210 comprises a network interface for communicating with other systems via a network. Network interface 210 comprises one or more of a GSM interface, a CDMA interface, an LTE interface, a WiFi interface, an Ethernet interface, a Universal Serial Bus (USB) interface, a Bluetooth™ interface, an Internet interface, etc. Processor 224 comprises a processor for controlling the operations of vehicle event recorder 200, for reading and writing information on data storage 214, for reading and/or writing data via storage interface 204, etc. Processor 224 also comprises event detector 226 for determining events (e.g., collision events, hazardous maneuver events, distracted driving events, etc.) and short time scale model 228 for classifying and labeling the determined events (e.g., cell phone use, eating, drinking, smoking, not looking ahead, not wearing seat belt, etc.).

In some embodiments, short time scale model 228 comprises a machine learning model, a neural network, or any other appropriate model. In some embodiments, the short time scale model comprises a convolutional neural network, a recurrent neural network, and a fully connected layer. In some embodiments, the convolutional neural network receives a video frame and outputs an image vector representation of that frame. In some embodiments, the recurrent neural network receives the image vectors from the convolutional neural network and outputs a summary image vector that represents ten, or any other appropriate small number of, image vectors. In some embodiments, the fully connected layer is used to analyze and label each summary image vector for one or more class of driver behaviors; determine the probability associated with each driver behavior classification; and generate embedded image vectors by assigning the determined class labels and probabilities to each summary image vector. Event detector 226 is used to detect events and flag or mark an index for received A/V clips or within the continuous stream(s) of A/V data.

Data storage 214 comprises a data storage (e.g., a random-access memory (RAM), a read only memory (ROM), a nonvolatile memory, a flash memory, a hard disk, or any other appropriate data storage). Data storage 214 stores clips or continuous stream(s) of audio/video data from A/V 222. Data storage 214 comprises a data storage for storing instructions for processor 224, vehicle event recorder data, vehicle event data, sensor data, A/V data, driver scores, vehicle information, vehicle identifying information, anomalous event information, driver quality information, bad behavior indications, etc.

Processor 224, after utilizing short time scale model 228 to label events from A/V clips or streams, routes the labeled event data to data storage 214 for later retrieval at select vehicle stopping points, and/or compresses the A/V clips or streams for transmission to the vehicle data server via interface 202. Network interface 210 is used to receive updates to short time scale model 228 as it is updated and improved.

Figure 3:
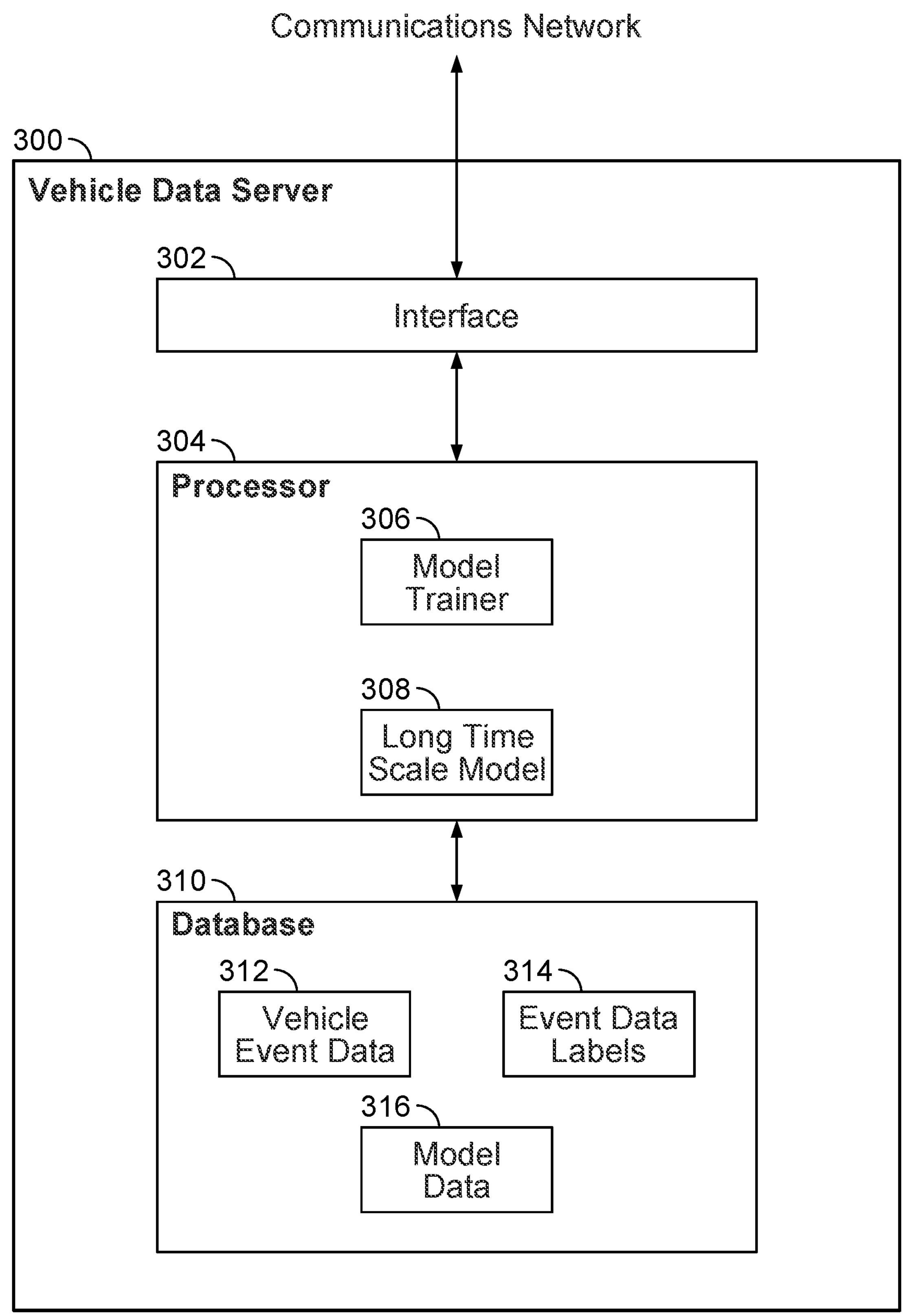
FIG. 3 is a block diagram illustrating an embodiment of a vehicle data server.

FIG. 3 is a block diagram illustrating an embodiment of a vehicle data server. In some embodiments, vehicle data server 300 comprises vehicle data server 104 of FIG. 1. In the example shown, vehicle data server 300 receives vehicle data information via a communications network using interface 302, including vehicle event data, sensor data, vehicle information, and raw data associated with a vehicle with a mounted vehicle event recorder. Received vehicle event data is stored in vehicle event data 312 of database 310.

In various embodiments, received vehicle event data is filtered and categorized for various criteria—for example, what vehicle event recorder it came from, the date recorded, the quality of video, which side of vehicle the driver is on (e.g., left side or right side based on geographic region), etc. In various embodiments, the vehicle event data is further processed into a form suitable for efficient human review—for example, event video data is reduced to a number of frames associated with an event and/or video frames are cropped to the immediate proximity of the driver.

In various embodiments, video images, clips, and/or streams comprising vehicle event data comprise various color bit depths (e.g., 16, 24, 32, 48-bit color, etc.), monochrome color (e.g., black and white, greyscale, or coloring that utilizes different shades of a single color, etc.), video resolution (e.g., 480, 720, 1080, 4K, 8K, etc.), and be compressed (e.g., using any useful coding standard(s) of the various Joint Photographic Experts Group (JPEG), Moving Picture Experts Group (MPEG), International Telecommunication Union (ITU) standards, or any other appropriate coding standard) or uncompressed full-frame video stored at the native frame rates and resolution of an A/V sensor (e.g., A/V 222).

In various embodiments, raw, filtered, categorized, and/or otherwise processed vehicle event data is sent to a set of reviewers (e.g., a human reviewer) to be annotated with labels that identify, describe, classify, and/or otherwise characterize the events in the vehicle event data. After reviewer labeling, the determined event data labels and associated vehicle event data are transmitted via interface 302 for storage in database 310.

Model trainer 306 builds a model by training a machine learning model, a neural network, or any other appropriate model. Model trainer 306 builds the model utilizing vehicle event data stored in vehicle event data 312 and associated event data labels stored in event data labels 314.

In some embodiments, the model comprises a recurrent neural network with greater capacity than the recurrent neural network used in the short time scale model. In some embodiments, the model utilizes self-attention with a feed-forward neural network (e.g., a transformer neural network). In some embodiments, the model is capable of analyzing a multiplicity of short time scale embedded image vectors over a long time scale (e.g., 10 minutes, 20 minutes, 30 minutes, a trip segment, a trip, a route, or any other appropriate long time period). In some embodiments, the model further comprises a fully connected layer. In some embodiments, the model also generates a trip label associated with long time scale events—for example, duration, and/or number of occurrences, the driver behavior, or any other useful trip information such as a specific driver driving a specific vehicle over a shift, to a destination, or for a route.

In some embodiments, model trainer 306 performs its training and then periodically tests at a plurality of check points (e.g., testing after training every N events or M seconds of training), and determines a test score for each of the check points. In some embodiments, training is continued until the test performance on class precision recall shows less than a threshold percentage improvement (e.g., 10%, 5%, 2%, 1%, etc.). Once the test performance reaches a reasonable maximum, model trainer 306 defines a long time scale labeling model that is executed as long time scale model 308.

In various embodiments, processor 304 provides vehicle event data to model trainer 306 in batches (e.g., tens or hundreds of event clips), and/or shuffles and reorders data (e.g., randomly) while training and testing the model to avoid systematic errors when fitting the model output to the assigned labels. Database 310 stores model data in model data 316 defining, and/or used by, a model as being determined by model trainer 306 or executed as long time scale model 308 (e.g., check point frames, updated weights, etc.).

Figure 4:
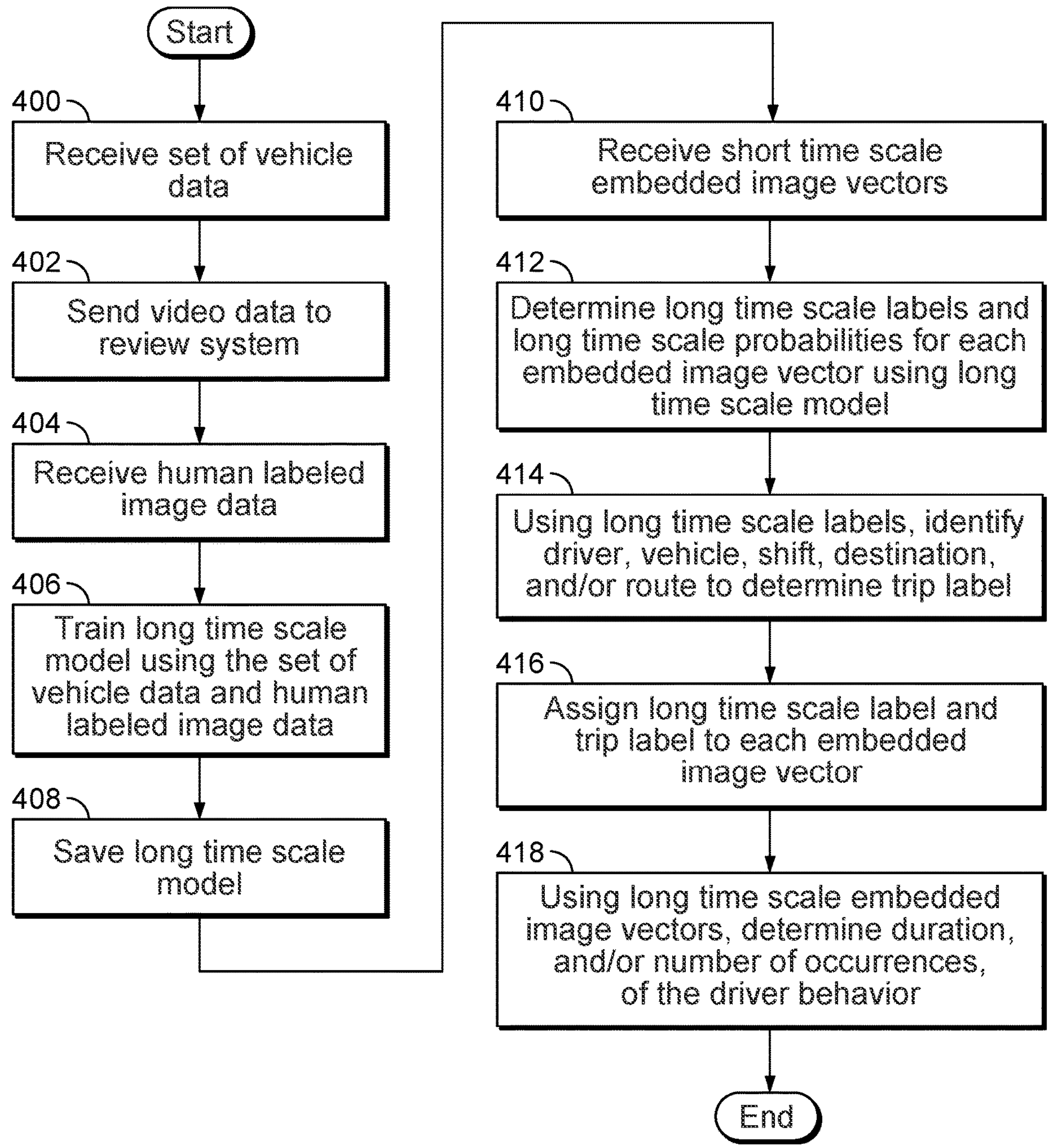
FIG. 4 is a flow diagram illustrating an embodiment of a process for determining long time scale labels, long time scale label probabilities, and trip labels.

FIG. 4 is a flow diagram illustrating an embodiment of a process for determining long time scale labels, long time scale label probabilities, and trip labels. In some embodiments, the process of FIG. 4 is executed by a vehicle data server (e.g., vehicle data server 300 of FIG. 3). In the example shown, in 400, a set of vehicle data is received. For example, a set of vehicle data is received from a vehicle event recorder at the vehicle data server, where event data includes video data from a video camera and embedded image vectors as generated by the vehicle event recorder processor. The vehicle data is stored in storage of a vehicle data server. In 402, video data is sent to a review system. For example, video data is sent to a review system for long time scale review and labeling. In some embodiments, video data is processed by the vehicle data server (e.g., by decimating and cropping) before transmission to the review system (e.g., review system 110 of FIG. 1). In some embodiments, a reviewer (e.g., a human reviewer) views the processed video data (i.e., image data) and selects one or more labels and assigns the labels to the image data. In 404, the human labeled image data is received by the vehicle data server from the review system. For example, the human labeled image data is stored in the vehicle data server database.

In 406, the long time scale model is trained using the set of vehicle data and human labeled image data. For example, the model is trained using a subset of the vehicle data and human labeled image data and then tested and that training is repeated using another subset of the data until the model error difference between iterations is less than a percentage improvement (e.g., 10%, 5%, 2%, 1%, etc.) or a predefined number of iterations is reached. In 408, the long time scale model is saved. For example, the model is stored in a database of the vehicle data server. In 410, short time scale embedded image vectors are received. For example, short time scale embedded image vectors are received that differ from the short time scale embedded image vectors used to train the model. In some embodiments, the different short time scale embedded image vectors are used to test the performance of the previously trained long time scale model.

In 412, long time scale labels and long time scale probabilities for each embedded image vector are determined using the long time scale model. For example, the model is run on a test set of embedded image vectors and the probabilities and/or confidence levels are determined for the members of the test data set. In 414, long time scale labels are used to identify the driver, vehicle, shift, destination, and/or route to determine a trip label. For example, the driver is identified by facial recognition software and/or by image recognition of an identity badge being worn by the driver. In 416, the long time scale label and trip label are assigned to each embedded image vector.

In 418, the long time scale embedded image vectors are used to determine the duration, and/or number of occurrences, of the driver behavior. For example, over the course of a trip, the number of times the driver was talking on a cell phone and how long the driver was talking on each call is determined. In some embodiments, the fully connected layer of the long time scale model is used to determine the duration, and/or number of occurrences, of the driver behavior, or to generate any other appropriate statistics, flags or warnings, etc., concerning the driver behavior. In some embodiments, the analysis results concerning driver behavior are transmitted to the user system (e.g., user system 112 of FIG. 1).

Figure 5:
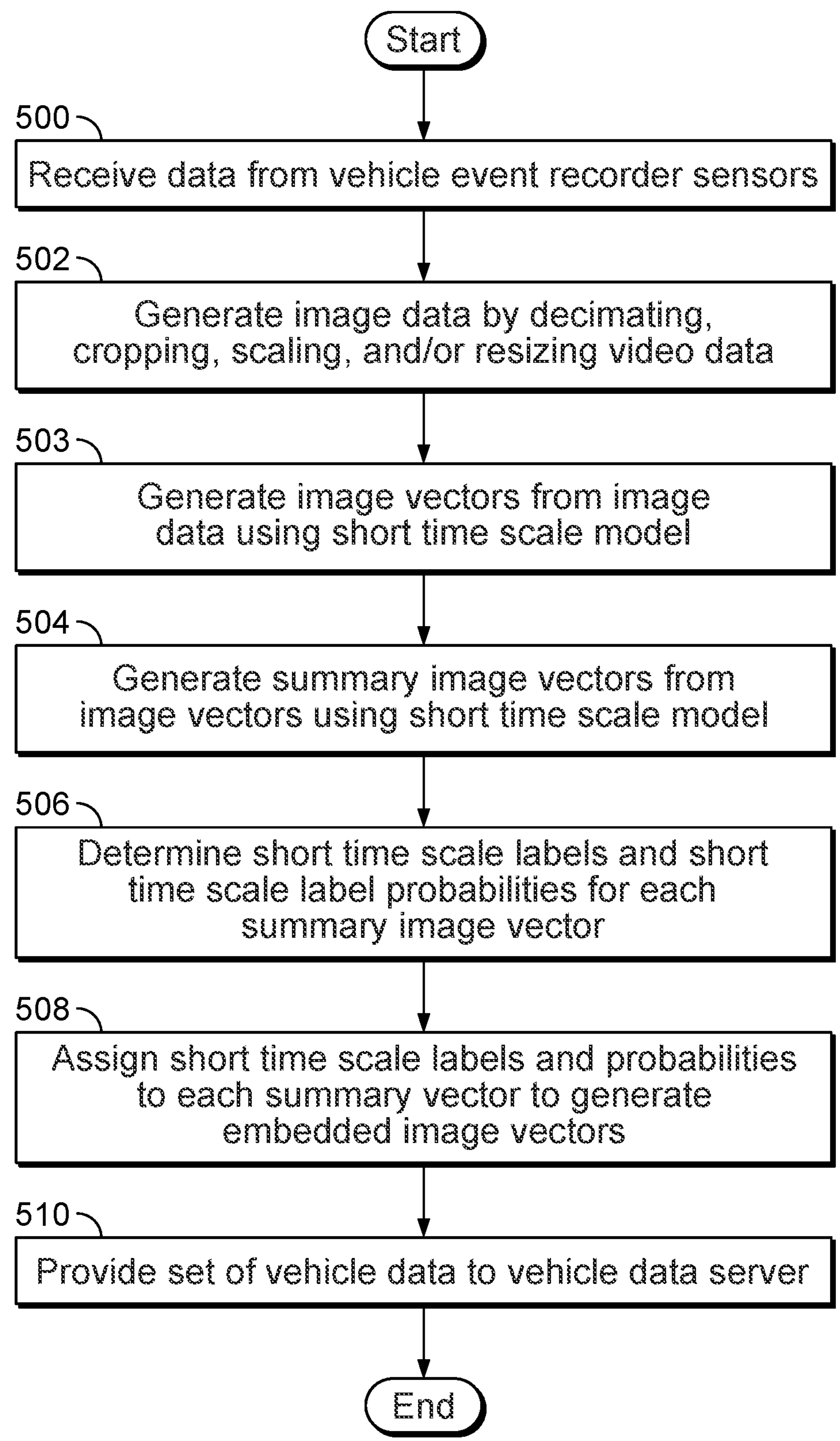
FIG. 5 is a flow diagram illustrating an embodiment of a process for generating short time scale embedded image vectors, short time scale labels, and short time scale probabilities.

FIG. 5 is a flow diagram illustrating an embodiment of a process for generating short time scale embedded image vectors, short time scale labels, and short time scale probabilities. In some embodiments, the process of FIG. 5 is executed by a vehicle event recorder processor (e.g., processor 224 of vehicle event recorder 200 of FIG. 2). In the example shown, in 500, data is received from the vehicle event recorder sensors. For example, data is received by the vehicle event recorder processor, where data includes A/V video data and GPS data. The data is stored in storage of the vehicle event recorder. In 502, image data is generated by decimating, cropping, scaling, and/or resizing video data. For example, video data received by the vehicle event recorder processor is decimated to a fixed number of frames associated with an event. In some embodiments, the fixed number of frames is set to using a specific number of frames per second. In some embodiments, N frames are selected for each event within a time window of M seconds. In some embodiments, a reference frame is selected for each second of 10 seconds of an event. In some embodiments, the fixed number of frames is set to a specific number of reference I-frames.

In some embodiments, the video data is cropped to a driver location portion of an image. In some embodiments, the video data comprises the video data cropped to a driver location portion of an image and resized to a model input image size. For example, the cropped video data is generated by cropping video frames to the immediate proximity of the driver such as within a fixed 299×299 pixel window within a frame or any other appropriate region of interest. In some embodiments, the cropped video data is resized to the short time scale model input image size. For example, the fixed window of the cropped image is rescaled to an input image size for the model. In some embodiments, the model has an input image size of 160×160 pixels.

In some embodiments, the video data is normalized to a data value range where the normalized data is generated by normalizing pixel values of the cropped video data. For example, each pixel value of the input image to the label model is put within a fixed value of ranges (e.g., between −1 and 1, between 0 and 255, etc.). In various embodiments, normalizing pixel values includes centering the pixel values—for example, by global or local centering methods. In various embodiments, pixel centering occurs before or after pixel normalization. In some embodiments, image cropping is performed prior to normalization.

In 503, image vectors are generated from image data using the short time scale model. For example, image vectors are generated by the vehicle event recorder processor using the short time scale model to represent the pixels (e.g., 160×160 pixels) within a selected image frame (e.g., an I-frame) in vector form. In some embodiments, the image vector comprises 1024 elements, or any other appropriate number of vector elements. In some embodiments, a convolutional neural network layer of the short time scale model is used to analyze/process a number of image data frames (e.g., 10 pre-processed I-frames, or any other appropriate number or type of image frames, as processed in 502) and covert each image data frame to an image vector.

In 504, summary image vectors are generated from image vectors using the short time scale model. For example, summary image vectors are generated by the vehicle event recorder processor using the short time scale model to summarize driver behavior over a short time scale—for example, a summary image vector that summarizes 10 seconds of image data (e.g., one I-frame selected every 10 seconds). In some embodiments, the recurrent neural network layer of the short time scale model receives the image vectors from the convolutional neural network layer and analyzes/processes a number of image vectors (e.g., 5, 10, 15, etc.) into a summary image vector that represents the information contained in the number of image vectors. In some embodiments, the summary image vector comprises 512 elements, or any other appropriate number of vector elements.

In 506, short time scale labels and short time scale label probabilities for each summary image vector are determined. For example, a fully connected neural network layer of the short time scale model receives summary image vectors from the recurrent neural network layer and analyzes/processes each summary image vector to determine a short time scale label and associated probability. Short time scale label probabilities are a number representation of the confidence the model has associated with a given driver behavior characterization (e.g., less confident, more confident, '+', '++', '+++', '−', '−−', a value between 0 and 1—for example, 0.2, 0.5, 0.7, 0.85, 0.98, etc.).

In some embodiments, the processes of 502, 503, 504, 506, and 508 run sequentially over a short time scale (e.g., 5 seconds, 10 seconds, 15 seconds, or any other appropriate short time scale). For example, over a short time scale, image data is generated from video event data, image vectors are generated from the image data, summary image vectors are generated from the image vectors, and short time scale labels and short time scale label probabilities are determined and assigned for each summary image vector to generate embedded image vectors. In some embodiments, there are short time periods (e.g., a 3 second time period, a 5 second period, a 7 second period, or any other appropriate short time scale period) where data is not processed (e.g., decimated, cropped, scaled, resized, converted to vector form, summarized, characterized, labeled, etc.) to minimize processor burden (e.g., by reducing excess heat or energy usage) or other data handling overhead within the vehicle event recorder. In some embodiments, there is an adjustable duty cycle for the processing of data—for example, processing data for 10 seconds, then not processing data for 5 seconds. In some embodiments, video data clips are processed into embedded image vectors every duty cycle period.

In 510, the set of vehicle data is provided to the vehicle data server. For example, the set of vehicle data comprising short time scale embedded image vectors, short time scale labels, and short time scale probabilities is transmitted to the vehicle data server for storage in the vehicle data server database.

Figure 6:
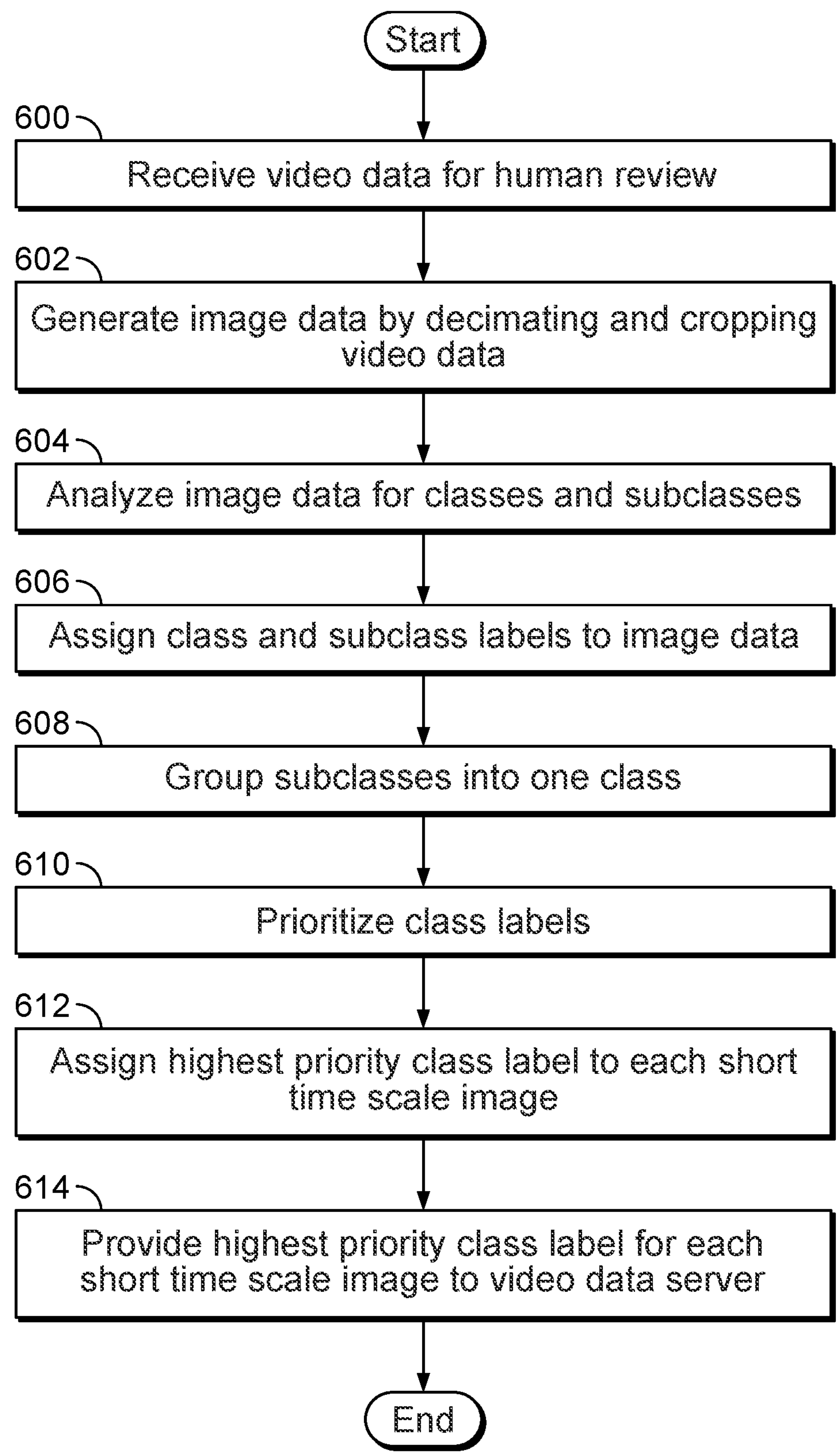
FIG. 6 is a flow diagram illustrating an embodiment of a process for human review of long time scale data to determine short time scale labels for short time scale images.

FIG. 6 is a flow diagram illustrating an embodiment of a process for human review of long time scale data to determine short time scale labels for short time scale images. In some embodiments, the process of FIG. 6 is executed by a review system (e.g., review system 110 of FIG. 1). In the example shown, in 600, video data is received for human review. For example, video data stored on the vehicle data server is transmitted to a review system data server for storage in the database of the review system data server. In 602, image data is generated by decimating and cropping video data. For example, video data is decimated (e.g., selecting N frames from M seconds of video) and cropped by the review system processor to match the decimation and cropping of process of 502 so the reviewers are reviewing the same image frames as the short time scale model to make their labeling decision. In some embodiments, the process of 602 is implemented by the vehicle data server processor prior to transmission to the review system.

In 604, image data is analyzed for classes and subclasses. For example, classes comprise events classified—for example, as driver distractions and safety concerns (e.g., cell phone use, eating, drinking, smoking, not looking ahead, not wearing seat belt, etc.). Subclasses comprise events that share a common class (e.g., cell phone use, eating, drinking, and smoking are all subclasses of a driver distraction class; not looking ahead and not wearing a seat belt are subclasses of a driver safety class; etc.). In 606, class and subclass labels are assigned to image data. For example, class and subclass labels are assigned to image frames, where the image frames originate from a video recording clip of a vehicle event. In 608, subclasses are grouped into one class. For example, the subclasses are grouped into a common class. In some embodiments, common classes are labeled based only on the highest priority concern (e.g., to improve efficiency of the model training). For example, in response to cell phone use being a greater concern than eating or drinking and all three subclasses of distraction events are observed in an event, the class is labeled as a cell phone distraction and the other distraction subclass labels are ignored.

In 610, class labels are prioritized. For example, class labels are prioritized based on a user configurable and pre-determined set of class rules and/or based on a particular client's concerns. In some embodiments, a safety violation (e.g., not looking ahead or not wearing a seat belt) may be considered a higher priority concern than a driver distraction (e.g., taking a sip of water, or a bite from an energy bar). In 612, the highest priority class label is assigned to each short time scale image. For example, the highest priority class label is output as the label associated with an event. In some embodiments, a ranked list of labels is output associated with an event. In 614, the highest priority class label for each short time scale image is provided to the video data server. For example, the highest priority class labels for each short time scale image are transmitted via the communications network to the video data server for storage in the video data server database.

Figure 7:
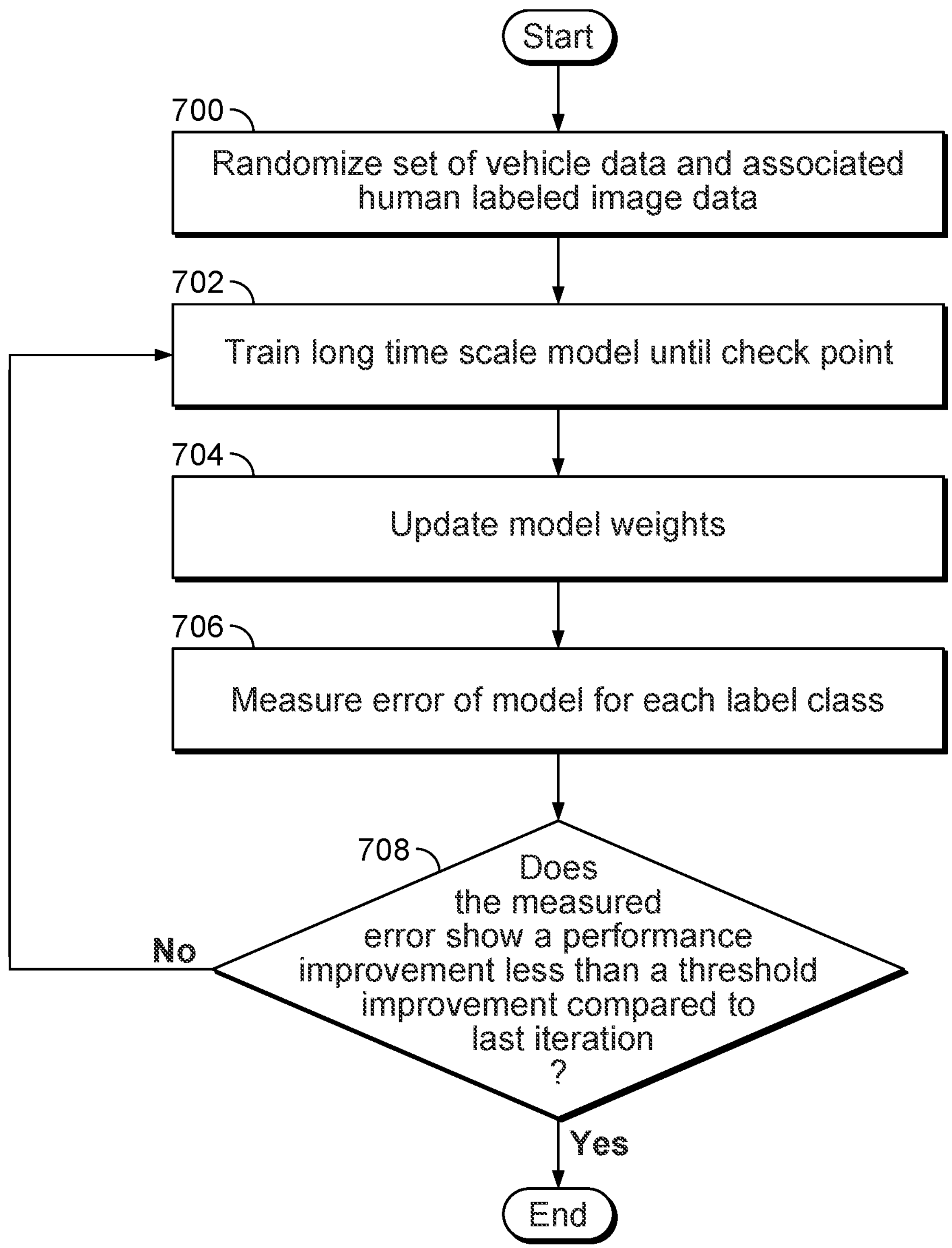
FIG. 7 is a flow diagram illustrating an embodiment of a process for training a long time scale model.

FIG. 7 is a flow diagram illustrating an embodiment of a process for training a long time scale model. In some embodiments, the process of FIG. 7 is executed by a vehicle data server processor (e.g., processor 304 of vehicle data server 300 of FIG. 3). In the example shown, in 700, a set of vehicle data and associated human labeled image data is randomized. For example, a training data set of N labeled vehicle events is ordered in a random fashion in preparation for training the long time scale model, wherein the training data set comprises a subset of the set of vehicle data and corresponding human labeled image data.

In 702, the long time scale model is trained until a check point. For example, the model is trained on a set of N labeled vehicle events. As the event data is presented, the model weights are generated to best match the reviewer assigned labels of the training data set. The model is tested and training is repeated using another subset of the data until the model error difference between iterations is less than a percentage improvement (e.g., 10%, 5%, 2%, 1%, etc.) or a predefined number of iterations is reached. The model error is assessed by comparing model-generated labels (i.e., predicted labels) for each event to the respective labels labeled by the set of reviewers.

In 704, the model weights are updated. For example, the updated weights are saved. In 706, the error of the model for each label class is measured. For example, the model error is indicated for each of the labels associated with an event and statistics are compiled related to each of the labels over the training data set.

In 708, it is determined whether the measured error shows a performance improvement less than a threshold improvement compared to a last iteration. For example, it is determined whether the difference in measured error is less than a threshold percentage improvement between iterations (e.g., 10%, 5%, 2%, 1%, etc.) or a predefined number of iterations (e.g., 3, 4, 5, 6, etc.) is reached. In response to the measured error showing a performance improvement less than a threshold improvement compared to the last iteration, the process ends. In response to the measured error not showing a performance improvement less than a threshold improvement compared to the last iteration, control passes to 702.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for characterizing driver behavior, comprising:

an interface configured to:

receive short time scale vehicle data associated with a vehicle with a mounted vehicle event recorder, wherein the short time scale vehicle data comprises an embedded image vector that characterizes vehicle data over a short time period, wherein a short time scale model executing on the event recorder generates the embedded image vector using image data associated with the short time period; and a processor configured to:

determine, using a long time scale model, a long time scale label associated with the embedded image vector; and assign the long time scale label to the embedded image vector, wherein the long time scale model is trained using a set of existing long time scale labeled embedded image vectors.

2. The system of claim 1, wherein the long time scale label is used to indicate the driver behavior.

3. The system of claim 1, wherein the driver behavior comprises talking, eating, drinking, smoking, whether a driver is unbelted, and/or reacting to an obstruction.

4. The system of claim 1, wherein the long time scale label is used to determine duration, and/or number of occurrences, of the driver behavior.

5. The system of claim 1, wherein the long time scale label is used to determine a trip label.

6. The system of claim 5, wherein the trip label is associated with a specific driver driving the vehicle over a shift, to a destination, or for a route.

7. The system of claim 1, wherein short time scale video event data is input to the short time scale model.

8. The system of claim 7, wherein the short time scale video event data is decimated to generate the image data.

9. The system of claim 8, wherein decimating the short time scale video event data comprises selecting N reference frames from an M second long video segment.

10. The system of claim 7, wherein the short time scale video event data is cropped to generate the image data.

11. The system of claim 10, wherein cropping the short time scale video event data comprises extracting a subset of a reference frame that is likely to contain a driver.

12. The system of claim 7, wherein the short time scale video event data is scaled to generate the image data.

13. The system of claim 7, wherein the short time scale video event data is resized to generate the image data.

14. The system of claim 1, wherein the short time scale vehicle data comprises, as generated by the short time scale model, a short time scale label and a short time scale probability associated with the embedded image vector.

15. The system of claim 14, wherein the short time scale label comprises a micro prediction label.

16. The system of claim 15, wherein the micro prediction label is for a 10 second period.

17. The system of claim 1, wherein the long time scale model is trained using embedded image vectors associated with the set of existing long time scale labeled embedded image vectors, short time scale labels associated with the set of existing long time scale labeled embedded image vectors, short time scale label probabilities associated with the set of existing long time scale labeled embedded image vectors, human labeled image data associated with the set of existing long time scale labeled embedded image vectors, or any combination thereof.

18. A method for characterizing driver behavior, comprising:

receiving short time scale vehicle data associated with a vehicle with a mounted vehicle event recorder, wherein the short time scale vehicle data comprises an embedded image vector that characterizes vehicle data over a short time period, wherein a short time scale model executing on the event recorder generates the embedded image vector using image data associated with the short time period;

determining, using a long time scale model executing on a processor, a long time scale label associated with the embedded image vector; and assigning the long time scale label to the embedded image vector, wherein the long time scale model is trained using a set of existing long time scale labeled embedded image vectors.

19. A computer program product for characterizing driver behavior, the computer program product being embodied in a non-transitory computer readable storage medium and comprising computer instructions for:

receiving a short time scale vehicle data associated with a vehicle with a mounted vehicle event recorder, wherein the short time scale vehicle data comprises an embedded image vector that characterizes vehicle data over a short time period wherein a short time scale model executing on the event recorder generates the embedded image vector using image data associated with the short time period;

determining, using a long time scale model executing on a processor, a long time scale label associated with the embedded image vector; and assigning the long time scale label to the embedded image vector, vector, wherein the long time scale model is trained using a set of existing long time scale labeled embedded image vectors.

20. The system of claim 1, wherein the embedded image vector is a summary image vector.

21. The system of claim 17, wherein an embedded image vector associated with an existing long time scale labeled embedded image vector is generated using a first set of image data and a human labeled image datum associated with the existing long time scale labeled embedded image vector is determined using a second set of image data, wherein the second set of image data has a higher resolution than the first set of image data.

* * * * *

UNITED STATES PATENT AND TRADEMARK OFFICE

CERTIFICATE OF CORRECTION

PATENT NO. : 11,590,982 B1
APPLICATION NO. : 16/545654
DATED : February 28, 2023
INVENTOR(S) : Jesse Daniels It is certified that error appears in the above-identified patent and that said Letters Patent is hereby corrected as shown below:

In the Claims

In Column 16, Line(s) 9, Claim 19, after "period", insert --,--.

In Column 16, Line(s) 17, Claim 19, after "vector,", delete "vector,".

Signed and Sealed this
First Day of August, 2023

Katherine Kelly Vidal

Katherine Kelly Vidal
*Director of the United States Patent and Trademark Office*